Feb. 2, 1960   G. MOLNAR   2,923,810
FLYING MULTIPLE SPOT WELDER AND ACTUATING MEANS THEREFOR
Filed March 18, 1958   4 Sheets-Sheet 1
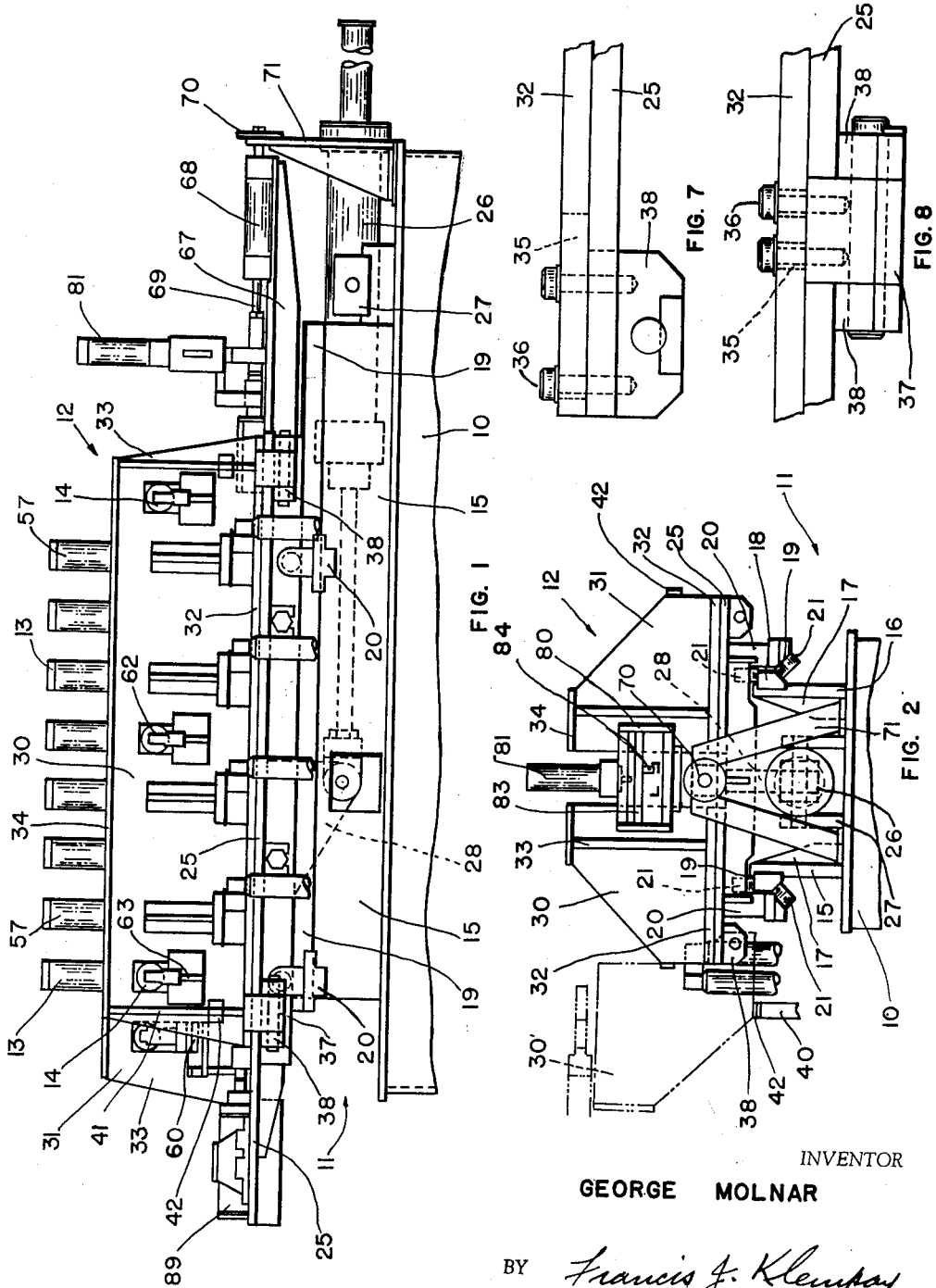
INVENTOR
GEORGE MOLNAR
BY Francis J. Klempay
ATTORNEY Feb. 2, 1960  G. MOLNAR  2,923,810
FLYING MULTIPLE SPOT WELDER AND ACTUATING MEANS THEREFOR
Filed March 18, 1958  4 Sheets-Sheet 2

INVENTOR
GEORGE MOLNAR

BY *Francis J. Klempay*
ATTORNEY

INVENTOR
GEORGE MOLNAR

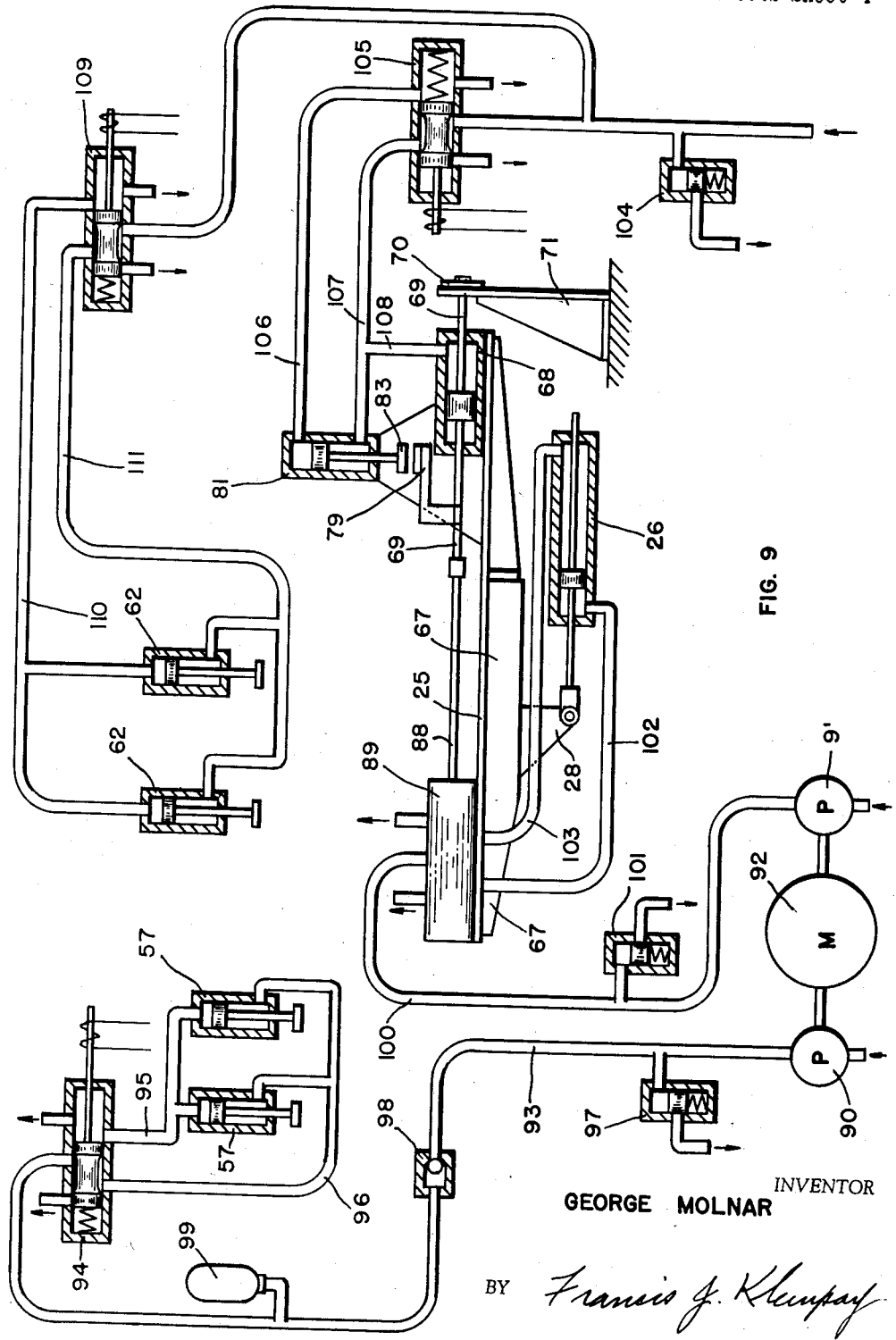

United States Patent Office 2,923,810
Patented Feb. 2, 1960

2,923,810

FLYING MULTIPLE SPOT WELDER AND ACTUATING MEANS THEREFOR

George Molnar, Warren, Ohio, assignor to The Taylor-Winfield Corporation, Warren, Ohio, a corporation of Ohio Application March 18, 1958, Serial No. 722,223

22 Claims. (Cl. 219—87)

The present invention relates generally to the welding art and has as its principal object the provision of an improved flying multiple spot welder and actuating means therefor.

As will be understood by those familiar with the welding art, it is often necessary to complete a plurality of welding operations on workpieces and various arrangements, including batteries of spot welders along with commutating apparatus for the electrical current, have been proposed in the prior art. In addition, certain machines, such as the one shown in the J. R. Lex patent, No. 2,213,709, have been proposed wherein a battery of welding assemblies are movable with the workpieces and weld the same while these workpieces are being moved from one station to another. Such devices are not especially adapted for high speed operations and the need exists for a flying multiple spot welder capable of extremely high speed operations. A high speed welder of this type may be employed in an automated continuous process line where, due to advances in other arts, the workpieces move at very high rates of speed.

In view of the above, it is a more specific object of the present invention to provide a flying multiple spot welder which is capable of extremely high speed operations for completing a plurality of welds. As an example, a welder constructed in accordance with the teachings of the present invention may be used in a continuous process line to complete spot welds spaced approximately four inches from each other in the direction the workpieces are traveling when the workpieces pass through the welder at a speed of one foot per second.

A more particular object of the invention is to provide improved actuating means for reciprocating the flying multiple spot welder. The flying multiple spot welder of the present invention comprises, in essence, a reciprocable carriage mounting a plurality of spot welding assemblies thereon. In order to complete a welding cycle the carriage must first be accelerated to and synchronized with the speed of travel of the workpieces and then the workpieces are welded. The welding assemblies are next retracted and the carriage must be returned to its original position in time for another welding cycle without missing a section of the workpieces. The present invention contemplates the use of a clamping cylinder mounted on the carriage for engaging the workpieces and an accurately controlled servo valve for very quickly bringing the carriage to the speed of the workpieces traveling through the welder.

Another object of the present invention is to provide a machine of the type above described which is characterized by its simplicity, ruggedness and capability of high speed operations. The carriage is mounted by a plurality of anti-friction rollers so that the same has low friction and undue forces are thus avoided during the fast acceleration thereof. Further, the reversing and returning portion of the actuating means is such that high shock loads are precluded. This arrangement allows the construction of a less expensive and simplified apparatus since large castings, etc. are not needed to absorb the high shock forces resulting if such an arrangement were not included. However, the flying multiple spot welder is characterized by its ruggedness and ability to withstand continuous operation.

Yet a further object of the invention is to provide a machine of the character described which mounts the welding assemblies in an improved manner for ease of maintenance and conservation of space. The welding assemblies are mounted in a pair of parallel rows above the workpieces and the rows of the welding assemblies are pivotally mounted whereby the welding area may be exposed along with the welding assemblies for maintenance, inspection, etc. The flying multiple spot welder of the invention also includes weld clamp assemblies for clamping the workpieces at spaced points during welding operations and the welding and clamping assemblies are mounted in alternate nesting relation.

The above, as well as other objects and advantages of the invention, will become more readily apparent upon consideration of the following specification and accompanying drawing wherein there is described and shown an illustrated embodiment of the invention.

In the drawing:

Figure 1 is a side elevation of a flying multiple spot welder constructed in accordance with the teachings of the present invention;

Figure 2 is an end view of the apparatus depicted in Figure 1;

Figures 7 and 8 are enlarged plan and end views, respectively, showing the arrangement employed for adjustably mounting the housing assemblies carrying the welding and clamping assemblies of the flying multiple spot welder; and Figure 9 is a schematic circuit diagram showing the improved actuating means for the apparatus of the present invention.

Figure 3:
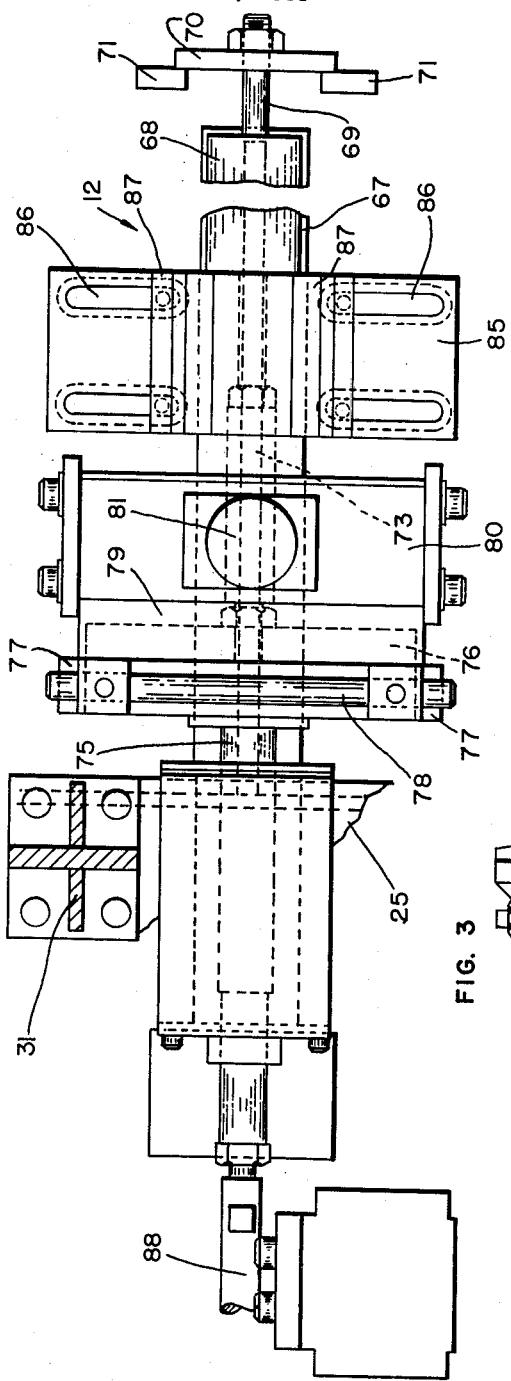
Figure 3 is an enlarged fragmentary plan view of the right hand end of the fly multiple spot welder shown in Figure 1 detailing a portion of the actuating means therefor.
Figure 4:
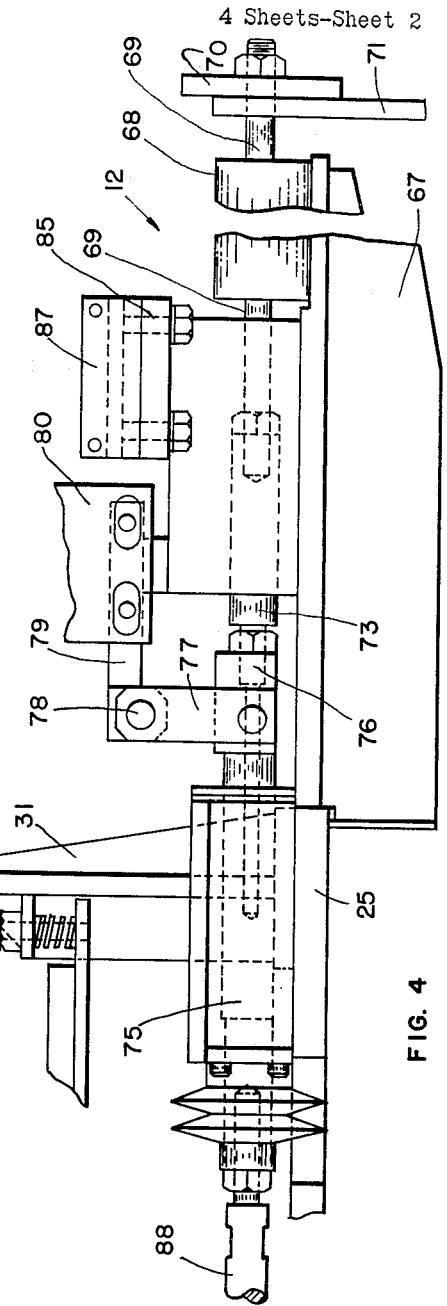
Figure 4 is a side elevational view of the apparatus of Figure 3.

Referring now to the drawing, and initially to Figures 1 and 2 thereof, the reference numeral 10 designates a table-like base which supports a flying multiple spot welder constructed in accordance with the teachings of the present invention. The flying multiple spot welder comprises a stationary base portion and a longitudinally movable carriage, represented generally by the reference numerals 11 and 12, respectively. The movable carriage 12 mounts a plurality of welding assemblies 13 and weld clamp assemblies 14 adapted to clamp and weld moving workpieces after the carriage has been accelerated and synchronized with the speed of the workpieces traveling therethrough in a manner to be hereinafter more fully explained.

The base portion 11 of the flying multiple spot welder comprises a pair of spaced parallel vertically extending plates 15 and 16 that are properly reinforced and supported from the base 10 by spaced gussets 17. Bolted to the upper portions of the outwardly facing main surface areas of the plates 15 and 16 are a pair of longitudinally extending wear-resistant guides 18 having hardened and ground angularly related bearing surfaces 19 thereon. The movable carriage 12 carries adjacent each corner thereof a downwardly depending hanger 20 which, in cooperation with various blocks carried thereby, mounts a pair of angularly disposed anti-friction rollers 21 adapted to bear against the angularly related ground bearing surfaces 19 of one of the guides 18. It should thus be apparent that the movable carriage 12 is supported for longitudinal movement by spaced pairs of anti-friction rollers 21 mounted on the depending hangers 20 engaging each of the guides 18. In accordance with preferred practice, the bearing surfaces 19 and the anti-friction rollers 21 are pre-loaded, by means of wedges and shims, not shown, so that there is absolutely no looseness or "play" in the movements of the carriage 12. The use of anti-friction rollers mounted adjacent each of the corners provides a generally rectangular structure which further tends to prohibit looseness, binding, etc. of the carriage during fast movement thereof. The pre-loaded bearing surfaces and anti-friction rollers provide a means for mounting the movable carriage 12 characterized by its low friction. This in turn provides a carriage having a low inertia or resistance to fast accelerations thereby precluding the occurrence of excessive and damaging shock forces during acceleration and synchronization of the carriage with the traveling workpieces.

The movable carriage 12 of the flying multiple spot welder comprises a generally rectangular heavy bottom plate 25 which overlies the guides 18 and the table-like base 10 and serves as a supporting platform for the various apparatus of the carriage. The previously described hangers 20 are indirectly connected with the bottom plate 25 as shown in the drawing so that this member is movable in a longitudinal direction. For moving the bottom plate 25 of the carriage there is provided a carriage drive cylinder 26 which is pivotally mounted between a clevis 27 extending upwardly from the table-like base 10 and whose piston rod is drivingly connected to a depending triangularly shaped connecting member 28. The triangularly shaped connecting member 28 is attached to the bottom plate 25 so that upon proper actuation of the drive cylinder 26 the carriage is caused to move in the longitudinal direction. It will be noted that the drive cylinder 26, which is provided with extra long adjustable cushions, is of sufficient size and capacity to move the carriage as desired during a welding cycle. Suitable control apparatus, to be later described, is provided for regulating the flow of fluid to the drive cylinder.

Mounted on the bottom plate 25 on opposite sides of the center thereof are longitudinally extending housing assemblies 30 and 31 which mount the welding and weld clamp assemblies 13 and 14 in a manner to be later described. Each of the housing assemblies 30 and 31 is of the same general construction, comprising a top plate 32 which overlies the bottom plate 25 to one side of the center thereof, a vertically extending member 33 and a transversely extending top member 34. The top plate 32 has a plurality of apertures 35 therein adjacent the corners of the bottom plate 25 (see Figures 7 and 8 of the drawing) through which extend a plurality of bolts 36. The bolts 36 carry a pivot block 37 which is pivotally mounted between a clevis formed by a pair of spaced blocks 38 that are attached directly to the bottom plate 25 by screws. The bottom plate is properly formed so that the pivot block 37 is carried directly by the bolts 36. The arrangement is such that each of the housing assemblies 30 and 31 are adjustably mounted on the bottom plate and transversely movable toward and away from the center line of the machine. In this manner the flying multiple spot welder is adapted for use with different sized, shaped, etc. workpieces as will be hereinafter more fully apparent.

The above described arrangement for adjustably mounting the housing assemblies 30 and 31 is such that these housing assemblies can be pivoted back (see Figure 2 of the drawing where the pivoted position of housing assembly 30 is depicted by the broken lines and indicated by the reference numeral 30') to open the center of the machine. This exposes the workpieces traveling through the machine as well as the welding and weld clamp assemblies mounted on the housing assembly for inspection, maintenance, etc. and it will be noted that the pivoting of the housing assemblies can be accomplished without effecting the adjustable mounting of the housing assemblies on the bottom plate 25. In order to facilitate the pivoting of the housing assemblies and the opening of the flying multiple spot welder a plurality of outboard supports 40 may be provided adjacent the corners of the spot welder. Each of the housing assemblies has a transversely projecting gusset 41 adjacent each end thereof which carries a wear-resistant plate 42. As shown in Figure 2 the wear-plate 42 carried by the gusset 41 is adapted to be received on the outboard support 40 to support the housing assembly in the pivoted or open position. It will be understood that the arrangement above described is particularly advantageous as the adjustable mounting of the housing assemblies greatly increases the flexibility and capability of the flying spot welder and the pivotal mounting of the housing assemblies facilitate maintenance, repairs, etc.

As previously indicated the various weld clamp and welding assemblies are mounted on the housing assemblies 30 and 31 in alternate staggered relation. In the illustrated embodiment of the invention each of the housing assemblies mounts four welding assemblies 13 and three weld clamp assemblies 14 positioned in aligned relation as shown in the various views of the drawing. Both of the housing assemblies 30 and 31 are of like construction—mounting equal numbers of the weld clamp and welding assemblies and having the same component parts—but these housing assemblies are offset from each other in the longitudinal direction as shown in Figure 1 of the drawing. As will be hereinafter more fully apparent, the weld clamp and welding assemblies extend from the inner faces of the vertical members 33 of the housing assemblies over the path of travel of the workpieces. The offsetting of the housing assemblies is such that the welding assemblies are positioned in staggered relation on opposite sides of the center line of the spot welder and the positioning of the weld clamp assemblies is such that each one thereof is opposite a welding assembly carried on the other housing assembly. Not only does this arrangement provide compact and light apparatus but also construction is greatly facilitated since each of the housing assemblies is of the same design.

Figure 5:
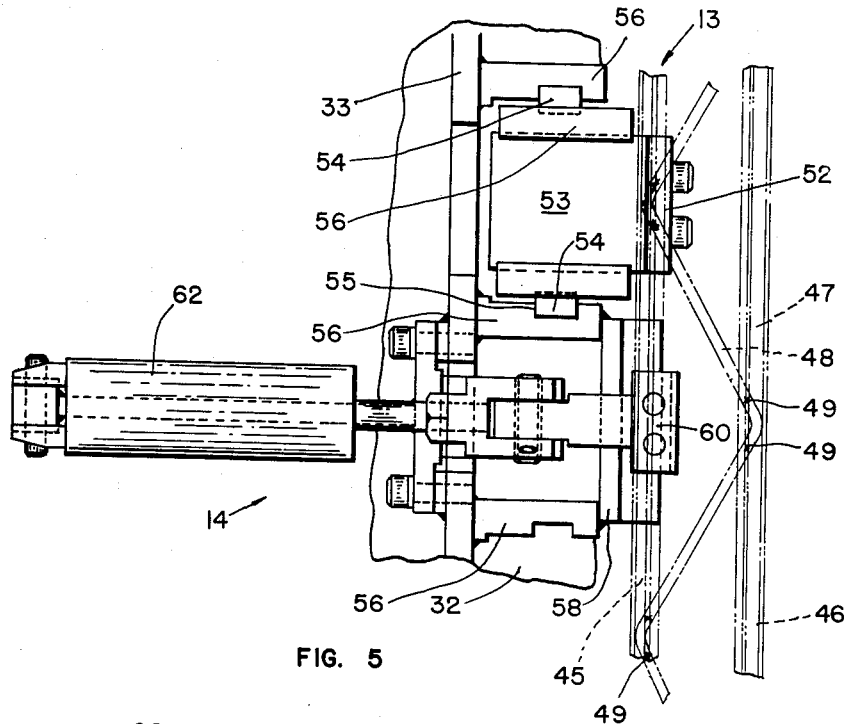
Figures 5 and 6 are fragmentary plan and end views, respectively, showing one of the weld clamp assemblies employed in the apparatus of Figure 1.
Figure 6:
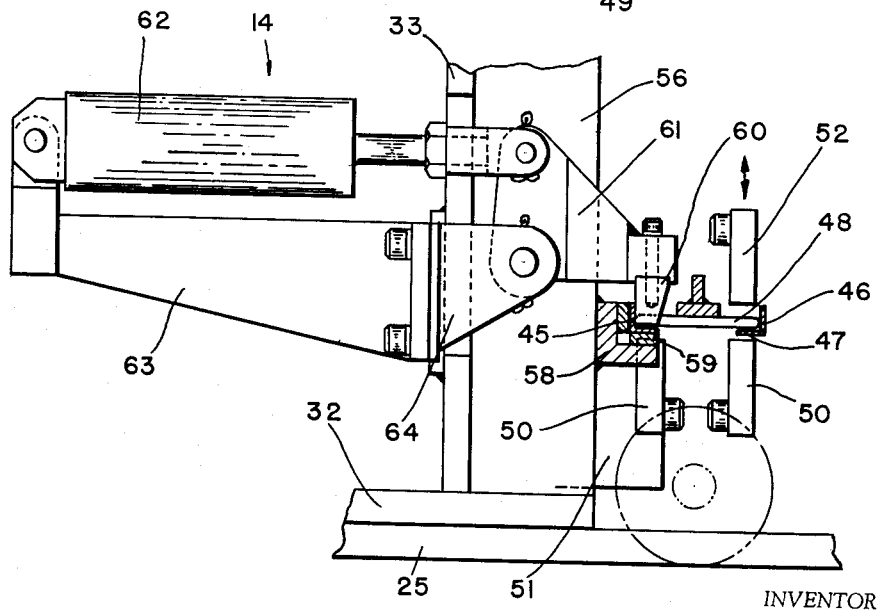

Before considering the specific mounting of the welding and weld clamp assemblies carried on the movable carriage and mounted on the housing assemblies, the type of workpieces being welded should be considered. Such workpieces, as shown in Figures 5 and 6 of the drawing, may comprise a pair of spaced channel sections 45 and 46 which each have an upwardly extending rib 47 on the bottom flange thereof and a properly bent piece of wire or rod stock 48. The piece of wire or rod stock 48 is bent in a zigzag fashion and extends alternately between the spaced channel sections 45 and 46. To join the workpieces it is desired to weld the piece of zigzagging stock to the channel sections 45 and 46 each time this member crosses the upwardly projecting ribs 47. The positioning of the welds with respect to the workpieces is shown at 49 in the drawing. The workpieces are adapted to pass through the flying multiple spot welder at a very high rate of speed between the two housing assemblies 30 and 31 and while passing between these assemblies the workpieces are clamped and welded. The welded workpieces then continue to other processing stations and the finished product may be used as studding, for example. It should be clearly understood that the workpieces described above in connection with the apparatus of the present invention are illustrative only since obviously such apparatus may be employed with other types of workpieces.

Each of the welding assemblies 13 comprises a lower stationary welding die 50 which is bolted to the forward face of a welding die block 51 and is mounted below the path of travel of the workpieces through the flying spot welder. The lower stationary welding die 50 is adapted to cooperate with a vertically reciprocable upper welding die 52 in welding the zigzagging piece 48 to one of the channel sections at two slightly spaced points. The vertically movable upper welding die is mounted on an upper welding die block 53 that has a pair of outwardly projecting guides 54 along the sides thereof which are in turn slidably received in vertical ways 55 formed in the facing areas of a pair of spaced vertically extending struts 56. The struts 56 are positioned in spaced relation throughout the length of the housing assemblies and are attached by welding or other convenient attachment means to the vertically extending members 33 of these assemblies. The welding die block 53 is connected to the piston rod of a fluid weld cylinder 57 and this cylinder may be mounted on the transversely extending top member 34. Thus, upon proper actuation of the fluid cylinder 57 the upper welding die is caused to move into welding relation with the lower die to weld the zigzag piece 48 to one of the channel sections. This structure is common to all of the welding assemblies and in the apparatus shown in Figure 1 eight welding assemblies are provided—four on each of the housing assemblies. Of course, suitable means, not specifically shown, would be employed for supplying welding current to the welding dies and it will be noted that the welding transformers may be positioned within the table-like base 10 if desired.

Each of the weld clamp assemblies 14 is of similar construction and to avoid unnecessary repetition in the specification only one of these assemblies will be described. The weld clamp assembly 14 comprises a stationary clamp portion including a length of channel shaped material 58 mounting a pair of co-extensive blocks 59 on the inwardly directed faces thereof. The blocks 59 form a guiding means for guiding the channel section workpieces through the flying multiple spot welder in addition to performing an important clamping function. The member 58 is welded in spanning relation to two of the struts 56 and it will be noted that the struts 56 are reinforced by this member to provide a rigid structure. A vertically movable upper clamping member 60 is replaceably mounted on one end of a bellcrank 61 which has another end thereof drivingly connected with the piston rod of a fluid weld clamp cylinder 62. The weld clamp cylinder 62 is mounted to the rear of the vertically extending member 33 and is pivotally attached to a rearwardly projecting bracket 63. The other end of the bellcrank 61 is pivotally received between a clevis 64 extending from the bracket toward the path of travel of the various workpieces. The arrangement is such that upon proper actuation of the weld clamp cylinder 62 the upper clamp member 60 will be lowered into clamping relation with one of the channel sections 45 or 46 and the lower clamping blocks 59. The weld clamp assemblies are so positioned and actuated at such a time that the zigzag workpiece 48 is not clamped thereby. It will be noted that the alternating sections of the lower clamping blocks 59 provide a continuous guiding means for the workpieces traveling through the flying multiple spot welder.

In the operation of the flying multiple spot welder it is necessary to provide means for actuating the carriage. During a welding cycle it is necessary to first accelerate and synchronize the carriage with the speed of the workpieces, then actuate the weld clamp and welding assemblies at the proper time to weld the workpieces and then return the carriage to its original position in time for another welding cycle so that sections of the workpieces are not missed. The apparatus for so actuating the flying multiple spot welder will now be described.

Supported from the front end of the carriage in the direction of travel of the workpieces is a cantilevered support 67 which mounts much of the actuating means of the present invention. Mounted on the extreme forward end of the support 67 is a reversing cylinder 68 whose piston rod 69 extends in both directions therefrom. The forward end of the piston rod 69 adjustably mounts a circular stop plate 70 which, at certain times, is adapted to engage and abut against a pair of upwardly converging stop members 71 to adjustably limit movement of the carriage in one direction. It will be observed that the stop members 71 project upwardly from the table-like base 10 and therefore are stationary with respect to the movement of the carriage. These members are so arranged as not to interfere with the operation of drive cylinder 26 upon actuation thereof. The rear end of the piston rod 69 is threadably received in a coupling member 73 which rigidly connects the piston rod with a rod-like member 75. Positioned about the rod-like member 75 near the forward end thereof is a large transversely extending block-like fitting 76 that supports at the side edges thereof a pair of upwardly extending members 77 which are spanned by an elongated transversely extending pivot pin 78 at their upper ends. The pivot pin 78 pivotally mounts a large plate-like lower clamping member 79 which extends into a generally rectangular clamping box 80 to be hereinafter more fully described. The lower clamping member is adapted for limited movement and its upper surface is disposed directly beneath the normal path of travel of the workpieces.

Mounted over the lower clamping member is the rectangular clamping box 80 which mounts on the upper surface thereof a vertically projecting fluid clamping cylinder 81. The piston rod of this cylinder extends into the clamping box 80 (see Figure 2 of the drawing) and carries a vertically movable upper clamping member 83 which is guided in the clamping box 80. A small clamping die 84 is adjustably mounted on the upper clamping member 83 and the arrangement is such that upon proper actuation of the fluid clamping cylinder 81 the upper clamping member is lowered to bear against the top edges of the channel sections 45 and 46 while the clamping die 84 tightly engages the zigzag rod-like workpiece 48. Since the lower clamping member is connected directly to the rod-like member 75 this last mentioned member, as well as fitting 73, piston rod 69 and any other apparatus connected thereto, will be accelerated to and move in synchronism with the speed of the workpieces moving through the flying spot welder when the workpieces are clamped between the clamping members.

The lower clamping member 79 is positioned directly beneath the path of travel of the workpieces and helps to guide the workpieces through the flying spot welder. Mounted rigidly from the cantilevered support 67 in front of the clamping box 80 is a transversely extending plate 85 having a plurality of elongated apertures 86 therein which serve to adjustably mount a pair of transversely spaced angle guides 87. The guides are adjustable to accommodate different sized and shaped workpieces.

The rod-like member 75 has its rear end attached to a drive rod 88 which extends the length of the housings 30 and 31 directly below the normal path of workpiece travel and this drive rod has its rear end attached to the internal valve spool, not specifically shown, of a servo valve 89. The servo valve 89 is mounted on the extreme rear edge of the bottom plate 25 and, as is well known in the art, is essentially a proportioning device—that is the fluid supplied thereto will be proportioned and distributed between the various ports thereof in a manner dependent upon the position of the internal valve spool. From examination of the various views of the drawing it should be apparent that the drive rod 88, rod-like member 75, the clamping mechanism, fitting 73 and piston rod 69 form a relatively rigid and horizontally extending follower assembly that will move with and in response to the workpieces moving through the welder when the clamping cylinder 81 is actuated to lower the upper clamping member and die into clamping relation with the workpieces. However when the workpieces are not clamped the follower assembly is movable independently of the carriage 12 and/or the workpieces traveling through the flying multiple spot welder.

Referring now to Figure 9 of the drawing, there is shown in schematic relation a preferred embodiment of a fluid actuating circuit for the flying multiple spot welder of the present invention. This fluid circuit comprises a first source of fluid, preferably a source of noncompressible hydraulic fluid, not specifically shown, for actuating the various welding cylinders 57, servo valve 89 and drive cylinder 26. A second source of compressible fluid, air, for example, is provided for actuating the weld clamp cylinders 62, the clamping cylinder 81 and the reversing cylinder 68.

Connected with the source of noncompressible hydraulic fluid are a pair of pumps 90 and 91 which are driven by an electrical motor 92. The output of pump 90 is transferred via conduit 93 to a four-way solenoid operated fluid valve 94 having a pair of its ports connected to tank and another pair of its ports connected to conduits 95 and 96 which communicate with opposite ends of the welding cylinders 57. Interposed in the conduit 93 is a spring biased unloading valve 97 whose function is to prevent an excessive build up of pressure in the conduit 93 and the fluid apparatus in communication therewith. Also positioned in the conduit 93 is a check valve 98 and an accumulator 99 as is conventional to prevent reverse flow of fluid in this conduit.

Pump 91 is connected by a conduit 100 to the inlet port of the servo valve 89. A spring-biased unloading valve 101 is positioned within this last mentioned conduit and performs the same function as unloading valve 97 in conduit 93. A first pair of outlet ports of the servo valve 89 are connected to the opposite sides of the piston of the drive cylinder 26 by the conduits 102 and 103 and a second pair of ports are connected to tank. As set forth above, the position of the valve spool of this servo valve will control the interconnection of the fluid from pump 91 with opposite ends of drive cylinder 26 and the relatively small movement of the valve spool will proportion the fluid to the drive cylinder in response to relative movement of the carriage 12 and the workpieces while the carriage is moving with the workpieces.

Connected with the source of compressible fluid, which may be the compressed air line usually available in most industrial plants, is a spring-biased unloading valve 104 and a solenoid operated four-way valve 105. A pair of ports of this last mentioned valve are connected via conduits 106 and 107 to the head and rod ends of the fluid clamping cylinder 81, respectively. It will also be noted that a conduit 108 is provided connecting the rear end of reversing cylinder 68 with the rod end of the clamping cylinder 81 and the four-way valve 105. Also connected to the source of compressible fluid is another four-way valve 109 which is adapted to supply fluid through conduits 110 and 111 to the ends of the weld clamp cylinders 62 upon proper actuation thereof.

The use of this fluid circuit will perhaps best the understood in connection with the operation of the flying multiple spot welder that is described below.

Operation

Considering now the operation of the apparatus above described, it will be assumed that the necessary set-up adjustments have been made for the size and shape of workpieces being welded and that the various valves are in the positions shown in Figure 9 of the drawing. Thus, fluid will be supplied from pump 90 to the rod end of the fluid welding cylinders 57 and air will be supplied from the source through valves 105 and 109 to the rod ends of the clamping cylinder 81 and the weld clamp cylinders 62, respectively. It will be noted that pressure will also be supplied to the right hand end of the reversing cylinder 68 thereby keeping the piston thereof and the follower assembly under pressure. At this time the servo-valve spool will be in the neutral position with all ports thereof blocked. Both the carriage 12 and the follower assembly, and consequently all the appurtenant equipment carried and operated thereby, will be at rest since the upper clamping member 83 is held in the retracted position by the clamping cylinder 81.

It is also assumed that initially the workpieces are traveling at the desired rate of speed through the flying multiple spot welder of the present invention. Of course, suitable conveying means would be provided for moving the workpieces through the welder and the welder may be an integral part of a continuous process line wherein the workpieces are formed from coils of metal strip. Such an automated line might include an uncoiler, a roll former and slitter, web former, the flying multiple spot welder, cutoff and run out table, for example, as will be apparent to those skilled in the arts.

At a given synchronizing signal—said signal being responsive to a predetermined length of the workpieces traveling through the welder and/or the position of the workpieces with respect to the welder—the valve spool of four-way valve 105 is shifted to the right so that fluid is supplied to the head end of clamping cylinder 81. This causes the upper clamping member 83 and clamping die 84 to move downwardly into clamping relation with the workpieces and the lower clamping member 79. It is noted that both the right hand end of the reversing cylinder 68 and the rod end of the clamping cylinder 81 are now connected to exhaust.

As soon as the workpieces are clamped and pressure is relieved from the reversing cylinder 68 the follower assembly begins to move to the right thereby shifting the spool of the servo valve to admit fluid from pump 91 to conduit 102 and the left hand side of the drive cylinder 26. The carriage 12 is immediately accelerated and synchronized with the speed of the workpieces passing through the flying multiple spot welder. Both the follower assembly and the carriage 12 will move in the same direction with any difference to the speeds of these members being evidenced by relative movement of the valve housing and the internal valve spool of the servo valve 89 which movement will supply fluid to the drive cylinder 26 in a manner to synchronize the speed of the carriage with the speeds of the workpieces and the follower assembly. This is, in essence, a feedback system wherein the speed of the carriage (the amount of fluid supplied to the drive cylinder 26) is responsive to the speed of the workpieces traveling through the welder by the use of the follower assembly and servo valve 89 so that the speeds of the carriage and the workpieces are closely synchronized when the workpieces are clamped.

When the speed of the carriage is synchronized with the speed of the workpieces the spool of solenoid operated valve 109 is shifted so that fluid is supplied to the head ends of weld clamp cylinders 62 to actuate the same. This causes the bellcrank 61 associated with each of the weld clamp cylinders to pivot and the upper clamping member 60 carried thereby is lowered into clamping relation with the channel sections 45 and 46 and the block 59. In this manner the channel sections are securely clamped at spaced points to and throughout the length of the moving carriage.

Next the valve 94 is actuated to shift its valve spool in such a manner that fluid is directed to the head ends of the welding cylinders 57. Upon actuation of these cylinders the upper welding dies are lowered into pressure engagement with the workpieces and the lower welding dies 50. Then welding current is passed between these dies and the workpieces to weld the zigzag rod-like workpiece 48 to the channel sections 45 and 46 at the places it crosses the upwardly projecting ribs 47. The positioning of the completed welds, as previously explained, is shown at 49 in Figure 5 of the drawing. Of course, it is contemplated that the welding current and welding cycle will be accurately controlled and control apparatus can be employed for accomplishing this as will be apparent to those skilled in this particular art.

As soon as the welds are completed valves 94 and 109 are reversably actuated so that the weld clamp cylinders 62 and the weld cylinders 57 move the upper clamping members and the upper welding dies to their original retracted positions. The spool of valve 105 is returned to its original position shown in Figure 9 and this directs fluid to retract the piston of clamping cylinder 81 and the clamping member 83 carried thereby. With the pistons of the welding, weld clamp and clamping cylinders returning to their starting position the welded workpieces are completely freed and adapted for movement with respect to the movable carriage.

When valve 105 is actuated to supply fluid to the rod end of clamping cylinder 81 pressure is also supplied to the right hand side of the piston of the reversing cylinder 68 via the conduit 108. This causes the follower assembly to reverse its direction of travel and move to the left thereby moving the spool of the servo valve 89 to a position where fluid is supplied from the pump 91 to the right hand side of the drive cylinder 26. It will be noted that the piston of the reversing cylinder 68 will be "cushioned" by the compressible fluid therein as the pressure builds up and reverses the direction of travel of the follower assembly. The cylinder 26 now drives the carriage to the left thereby returning it to its original starting position. When the carriage reaches its starting position the spool of servo valve 89 will again be in its neutral position with stop plate 70 engaging stop members 71 and the flying multiple spot welder is ready for another cycle of welding operations when another synchronizing signal is received.

The actuating means for the flying multiple spot welder is characterized by its extremely fast operations and this is very important in continuous process lines wherein the workpieces travel at high speeds. As an example, a machine of the type disclosed employing the actuating mechanism shown is capable of completing welds on workpieces traveling one-foot per second with the complete cycle—including synchronization of the carriage, clamping, welding and return of the carriage—taking approximately two seconds. It will be appreciated that this is very fast operation—especially when it is remembered that the carriage is initially at rest, accelerated to a high speed, the direction of travel thereof reversed and returned to its original rest position. Of course, the actuating mechanism shown herein may be advantageously employed with other type of equipment, such as a flying saw, for example, where it is necessary to synchronize the speed of the working element or tool with the speed of the workpieces.

One of the inherent advantages of the actuating system is that the carriage will always be in synchronism with the workpieces when the same are clamped because of the feedback arrangement. Thus, any changes in the rate of travel of the workpieces will be immediately sensed by the follower assembly and the servo valve will direct fluid to the drive cylinder to connect for this change in speed and the welding operation can be completed without interruption. Also, shock forces due to different rates of speed of the carriage and the workpieces are eliminated which is important since the life of the welder is increased and the physical size thereof can be within reasonable limits.

It should thus be apparent that I have accomplished the objects initially set forth by providing an improved flying multiple spot welder and actuating means therefor. Although there is shown and described a preferred illustrated embodiment of the invention, it should be understood that many changes may be made therein without departing from the clear teaching of the invention. Accordingly, reference should be had to the following appended claims in determining the true scope thereof.

I claim:

1. A flying multiple spot welder for completing a plurality of welds between moving workpieces on the fly comprising a base, a carriage mounted on said base and movable thereon in the direction of movement of said workpieces, a plurality of welding means mounted on said carriage in a pair of longitudinally extending transversely spaced rows, said workpieces traveling through said welder between said transversely spaced rows of said welding means, said welder further comprising a pair of housings, said welding means being mounted on said housing, and said housings being pivotally mounted on said carriage for pivotal movement away from said workpieces to expose the same.

2. A flying multiple spot welder for completing a plurality of welds between moving workpieces on the fly comprising a base, a carriage mounted on said base and movable thereon in the direction of movement of said workpieces, a plurality of welding means mounted on said carriage in a pair of longitudinally extending transversely spaced rows, said workpieces traveling through said welder between said transversely spaced rows of said welding means, and said welding means being pivotally mounted on said carriage for pivotal movement away from said workpieces to expose the same.

3. Apparatus according to claim 2 further characterized by supporting means positioned on opposite sides of and outwardly of siad rows of said welding means for supporting the same when in the pivoted position.

4. A flying multiple spot welder for completing a plurality of welds between moving workpieces comprising a base, a pair of spaced parallel guides mounted on said base and extending in the direction of travel of said workpieces, said guides having bearing surfaces thereon, a carriage, said carriage mounting pairs of transversely and longitudinally spaced anti-friction rollers, said rollers engaging said bearing surfaces of said guides, the arrangement being such that said carriage is guided for movement in the direction of travel of said workpieces, said carriage having a generally rectangular shape, a depending hanger mounted adjacent each corner of said carriage, each of said hangers mounting an angularly related pair of said anti-friction rollers, and each of said guides having an angularly related pair of said bearing surfaces adapted to be engaged by pairs of said rollers.

5. In a flying spot welder for completing a welding operation between moving workpieces on the fly comprising a base, a carriage mounted on said base for movement in the direction of travel of said workpieces, means to move said carriage, means to sense the speed of travel of said workpieces with respect to the speed of travel of said carriage, and means to actuate said means to sense in response to said means to move to drive said carriage in synchronism with said workpieces.

6. Apparatus according to claim 5 further characterized in that said means to move comprises a fluid cylinder, and said means to actuate comprises in part a device for proportioning fluid to said fluid cylinder in response to said means to sense.

7. Apparatus according to claim 6 further characterized in that said means to sense comprises a clamping means adapted to clamp said workpieces, and means transmitting the motion of said clamping means to said device for proportioning fluid to said fluid cylinder.

8. A flying multiple spot welder comprising a base, a longitudinal reciprocable carriage mounted on said base for movement in the direction of travel of the workpieces, a plurality of welding means mounted on said carriage in a pair of longitudinally extending transversely spaced rows, said workpieces traveling through said welder between said rows of welding means, a fluid cylinder mounted on said base beneath said carriage having driving connection with said carriage and adapted to move the same, valve means for directing fluid to said drive cylinder, means responsive to the speed of travel of said workpieces, and means interconnecting said means responsive and said valve means whereby carriage movement is controlled by said speed of travel of said workpieces.

9. Apparatus according to claim 8 further characterized in that said valve means is mounted on one end of said carriage and said means responsive is mounted on the other end of said carriage, and said means interconnecting comprising an elongated follower assembly extending the length of said carriage.

10. Actuating mechanism for reciprocating apparatus adapted to synchronize the same with a moving workpiece during a portion of its travel comprising a movable carriage, a drive cylinder connected to said carriage for moving the same, valve means for directing fluid to said drive cylinder, a reversing cylinder, a follower assembly interconnecting said reversing cylinder and said valve means whereby upon predetermined movement of said follower assembly said valve means is caused to direct fluid to the ends of said drive cylinder to move said carriage, and means to impart the movement of said workpiece to said follower assembly at predetermined times to cause actuation of said valve means.

11. Apparatus according to claim 10 further characterized in that said actuating apparatus further comprises means for biasing said follower means whereby said valve means is normally operative to direct fluid to said drive cylinder to move said carriage to its retracted position when movement of said workpiece is not imparted to said follower assembly.

12. Apparatus according to claim 11 further characterized in that said means to impart comprises a fluid clamping cylinder for clamping said workpiece to said follower assembly, and said means for biasing comprising means for supplying fluid to one side of said reversing cylinder when said workpiece is unclamped.

13. Apparatus according to claim 12 further characterized in that said means for supplying fluid to said reversing cylinder comprises a conduit connecting said one side of said reversing cylinder and one side of said clamping cylinder.

14. Actuating mechanism for reciprocating apparatus adapted to synchronize the same with a moving workpiece during a portion of its travel comprising a movable carriage, a drive cylinder for said carriage, valve means for directing fluid to either of the ends of said drive cylinder, means to control the actuation of said valve means to reciprocate said carriage, and means controlling said valve means in accordance with the difference in speeds of travel of said carriage and said workpiece during travel of said carriage with said workpiece to synchronize the same.

15. Apparatus according to claim 14 further characterized in that said valve means comprises a servo valve mounted on said cariage, a follower assembly for said servo valve, and means to move said follower assembly at the speed of said workpiece during travel of said carriage with said workpiece.

16. Apparatus according to claim 15 further characterized in that said means to control comprises a reversing cylinder connected with said valve means, said means to move said follower assembly comprising clamping means adapted to clamp said workpiece to said follower assembly for said servo valve, and means responsive to the release of said clamping means to bias said reversing cylinder to cause reversal of said follower assembly and shifting of said servo valve to retract said carriage.

17. A flying multiple spot welder for completing a plurality of welds between moving workpieces on the fly comprising a base, a carriage mounted on said base and movable thereon in the direction of movement of said workpieces, a pair of longitudinally extending housing assemblies each mounting a plurality of welding and weld clamp assemblies therealong in longitudinally spaced relation, said housing assemblies being mounted on said carriage, said housing assemblies being transversely spaced from each other to define a path of travel for said workpiece completely therebetween along said carriage, each of said welding and weld clamp assemblies mounting welding and clamping members overhanging said path of travel for said workpieces, and said housings being offset longitudinally with respect to each other whereby said overhanging welding and clamping members of said housings nest with respect to each other.

18. In a flying spot welder for completing a welding operation between moving workpieces on the fly comprising a base, a carriage mounted on said base for movement in the direction of travel of said workpieces, means to move said carriage, means to sense the speed of travel of said workpieces, and means to actuate said means to move in response to said means to sense to drive said carriage in synchronism with said workpieces.

19. Actuating mechanism for reciprocating apparatus adapted to synchronize the same with a moving workpiece during a portion of its travel comprising a movable carriage, means to move said carriage, means to actuate said means to move said carriage, means to sense the speed of travel of said workpiece relative to said carriage, and means controlling said means to actuate in response to said means to sense to synchronize said carriage with said workpiece.

20. In a welder assembly for completing a welding operation between workpieces comprising a base, a housing assembly, means supporting said housing assembly from said base, said housing assembly comprising a longitudinally and vertically extending member positioned to one side of the path of travel of said workpieces, a plurality of vertically and inwardly extending longitudinally spaced struts attached to said longitudinally and vertically extending member, a plurality of welding means, a plurality of clamping means, and each of said welding means and said clamping means being supported and guided for vertical movement between a pair of said vertically and inwardly extending longitudinally spaced struts.

21. Apparatus according to claim 20 further characterized by means to guide said workpieces through said welder, and said last mentioned means comprising a guide member attached to the forward faces of said struts.

22. Apparatus according to claim 20 further characterized in that said means for supporting said housing assembly from said base comprises a movable carriage, a second housing assembly identical with said first mentioned housing assembly mounted on said carriage in transversely spaced relation with respect to said first mentioned housing assembly, and said workpieces being adapted to travel through said welder assembly between said housing assemblies.

References Cited in the file of this patent

UNITED STATES PATENTS

| | | |
|---|---|---|
| 2,079,042 | Saives | May 4, 1937 |
| 2,213,709 | Lex | Sept. 3, 1940 |